(12) United States Patent
Hikmet et al.

(10) Patent No.: US 9,052,423 B2
(45) Date of Patent: Jun. 9, 2015

(54) LIGHTING DEVICE WITH A WAVEGUIDE PLATE

(75) Inventors: Rifat Ata Mustafa Hikmet, Eindhoven (NL); Roy Gerardus Franciscus Antonius Verbeek, Eindhoven (NL); Ties Van Bommel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 68 days.

(21) Appl. No.: 13/880,087

(22) PCT Filed: Oct. 20, 2011

(86) PCT No.: PCT/IB2011/054693
§ 371 (c)(1),
(2), (4) Date: Apr. 18, 2013

(87) PCT Pub. No.: WO2012/056382
PCT Pub. Date: May 3, 2012

(65) Prior Publication Data
US 2013/0215643 A1    Aug. 22, 2013

(30) Foreign Application Priority Data
Oct. 28, 2010   (EP) .................................... 10189184

(51) Int. Cl.
*G09F 13/04* (2006.01)
*F21V 8/00* (2006.01)
*B82Y 20/00* (2011.01)

(52) U.S. Cl.
CPC ............ *G02B 6/0033* (2013.01); *G02B 6/0003* (2013.01); *G02B 6/0015* (2013.01);
(Continued)

(58) Field of Classification Search
CPC .. G02B 6/0021; G02B 6/0023; G02B 6/0031; G02B 6/0035; G02B 6/004; G02B 6/0051; G02B 6/0065; G02B 6/0073; G02B 6/009
USPC ............... 362/23.2, 84, 97.1–97.3, 230, 231, 362/326–328, 330, 337; 349/57, 62, 69, 71
See application file for complete search history.

(56) References Cited

U.S. PATENT DOCUMENTS 7,929,816 B2 * 4/2011 Meir et al. ...................... 385/39
2005/0269582 A1 12/2005 Mueller
(Continued)

FOREIGN PATENT DOCUMENTS

JP         2009205827 A    9/2009
WO   WO2006043196 A1    4/2006
(Continued)

OTHER PUBLICATIONS

Weast Robert C. et al., "CRC Handbook of Chemistry and Physics", 69th Edition, 1988-1989, A Ready Reference Book of Chemical and Physical Data, CRC.

*Primary Examiner* — Hargobind S Sawhney
(74) *Attorney, Agent, or Firm* — Meenakshy Chakravorty (57) ABSTRACT

The invention provides a lighting device comprising (a) a transparent waveguide plate (200), with first surface (201), opposite second surface (202), and edge surface between the first surface and the second surface, (b) a light source (300) for providing light source light towards a light incoupling surface of the transparent waveguide plate, configured to provide at least part of the light source light in a direction perpendicular to one or more of the first surface and the second surface. The transparent waveguide plate further comprises a luminescent material, (400) configured to convert at least part of the light source light into luminescent material emission, and light outcoupling means (220) for coupling luminescent material emission and optionally light source light out of the transparent waveguide plate as lighting device light in a direction away from one or more of the first surface and the second surface.

14 Claims, 8 Drawing Sheets

(52) U.S. Cl.
CPC .............. *G02B6/0023* (2013.01); *G02B 6/005* (2013.01); *B82Y 20/00* (2013.01); *Y10S 977/773* (2013.01); *Y10S 977/774* (2013.01); *Y10S 977/95* (2013.01)

(56) References Cited

U.S. PATENT DOCUMENTS

| | | |
|---|---|---|
| 2006/0202105 A1 | 9/2006 | Krames |
| 2007/0126017 A1 | 6/2007 | Krames |
| 2008/0019114 A1 | 1/2008 | Stuyven |
| 2008/0198300 A1 | 8/2008 | Okumura |
| 2008/0308824 A1 | 12/2008 | Shchekin |
| 2009/0161341 A1 | 6/2009 | Meir |
| 2010/0002414 A1 | 1/2010 | Meir |
| 2010/0020531 A1 | 1/2010 | Choi |
| 2010/0103650 A1 | 4/2010 | Herrmann |

FOREIGN PATENT DOCUMENTS

| | | |
|---|---|---|
| WO | WO2006097868 A2 | 9/2006 |
| WO | WO2006114726 A2 | 11/2006 |
| WO | WO2007080555 A1 | 7/2007 |

\* cited by examiner

LIGHTING DEVICE WITH A WAVEGUIDE PLATE

FIELD OF THE INVENTION

The invention relates to a lighting device comprising a waveguide plate.

BACKGROUND OF THE INVENTION

Lighting systems wherein light transmitting plates are used are known in the art. US2010020531, for instance, describes a back lighting unit in which lower and upper surfaces of a light transmitting plate function as incident and exit surfaces of light, respectively, and a luminescent material film structure for wavelength-converting the light is provided at a position which the light is incident on or exits from said plate. The in US2010020531 described back lighting unit includes a light emitting means including a light emitting diode disposed to emit light upwards, a light transmitting plate disposed over the light emitting diode, having a lower surface allowing light to be incident thereon and an upper surface allowing light to exit therefrom, and a luminescent material film structure including a particulate luminescent material, formed on at least one of the lower and upper surfaces of the light transmitting plate.

SUMMARY OF THE INVENTION

Waveguides wherein light is coupled are used in many lighting applications. In some applications it is interesting to have thin, and for instance also flexible and compliable, waveguides. However, coupling light into thin waveguides is rather difficult and may be inefficient. When light is to be coupled from a side surface the thickness of the LED should be considerably smaller than the thickness of the waveguide making it difficult to couple light from side surfaces into the waveguide. Especially when light of high power LEDs are used and/or higher LED light power packages need to be coupled into a waveguide there may not be enough surface area on the edges of the waveguide to accommodate for it and/or to couple all LED light efficiently into the waveguide.

Hence, it is an aspect of the invention to provide an alternative lighting device, which preferably further at least partly obviates one or more of above-described drawbacks.

Here, it is suggested to use a (transparent) luminescent material layer placed in or on top of such a waveguide. The luminescent material is illuminated by a light source, especially a LED, such as preferably a solid state LED, which converts the light to another wavelength. The converted light may at least be partly confined in the waveguide. Light which would escape the waveguide can be converted by another luminescent color until it also becomes coupled out of the waveguide.

In this way colored light as well as white light can be produced in the waveguide using for instance a combination of luminescent materials. White light can for instance be produced either by using violet LEDs in combination with suitable luminescent materials. It is also possible to produce white light by using blue LEDs in combination with a suitable luminescent material and coupling part of the blue light also into the waveguide. For this purpose organic luminescent materials with a high transparency are good candidates.

Light coupled into the waveguide can be extracted by either structures (transparent) or scattering particles (semitransparent), especially patterned, to obtain (uniform) emission from the whole surface. At the extraction points it is also possible to use luminescent material to induce light extraction as well as additional light conversion.

Such waveguide can be used in various applications such as unobtrusive lighting. The suggested waveguide and the described methods for efficient light coupling in waveguides can also be used in various applications such as in, decorative lighting, lighting for atmosphere creation and embedded lighting applications. Suggested lighting devices can be used as ceiling light panels, wall light panels, floor light panels. The waveguides can also be position on top or wrapped around furniture or (other) consumer products. The lighting technology can also be used in many products where transparent foils are used such as umbrellas, inflatable products, curtains, etc.

Therefore, in a first aspect, the invention provides a lighting device comprising:
- a transparent waveguide plate (herein also indicated as "waveguide plate", "waveguide", or "plate"), comprising a first surface, an opposite second surface, and an edge surface between the first surface and the second surface,
- a light source for providing light source light towards a light incoupling surface of the transparent waveguide plate, wherein the light source is configured to provide at least part of the light source light in a direction perpendicular to one or more of the first surface and the second surface, and wherein the transparent waveguide plate further comprises:
- a luminescent material configured to convert at least part of the light source light into luminescent material emission,
- light outcoupling means for coupling luminescent material emission and optionally light source light out of the transparent waveguide plate as lighting device light in a direction away from one or more of the first surface and the second surface.

With such lighting device, high power can be coupled into the waveguide plate while using a thin waveguide plate. Further, light with predetermined colors may be obtained. Outcoupling may be obtained from the first surface and/or the second surface. In addition, if desired the plate may be flexible or may be curved (especially, the plane of the plate may be curved, i.e. normals to the first and/or second surface at different positions over the plate may not be arranged parallel).

As indicated above, the waveguide plate may be flexible or rigid. In an embodiment, the transparent waveguide plate is flat. In another specific embodiment, the transparent waveguide plate is curved. Here, curved refers to the first surface and/or second surface which may be curved (especially, the plane of the plate may be curved).

As will be clear to the person skilled in the art, the edge of the waveguide plate may also be curved, but may also be flat. The curvature of the edge may be in the plane of the waveguide plate and/or perpendicular to the plane of the waveguide plate. The waveguide plate may for instance be square, rectangular, oval, round, irregularly shaped (in the plane of the waveguide plate). The term "edge" refers to that part of the waveguide plate between the first surface and the second surface. The term "edge" may also refer to a plurality of edges, for instance in the case of a square or rectangular waveguide plate. In general, the edge will comprise a reflector, especially a specular reflector such as a mirror, in order to reduce or prevent outcoupling of the light via the edge.

Herein, the term "plate" is used to indicate that the waveguide has a length and/or width that are in general substantially larger than the height of the plate. The term plate does thus not necessarily imply "flat" (on a macroscopic scale; see also above). To illustrate the aspect of plate, the first surface and second surface are herein indicated as opposite surfaces.

For instance, the waveguide plate height may be in the range of 0.1-20 mm, such as 0.1-15 mm, and the length and width may for instance be at least 0.05 m, such as 0.3 m, like in the range of 0.05-5 m, like 0.1-2 m. The invention is suitable for thin waveguides with a height less than 5 mm, more suitable for waveguides with a height less than 1 mm and most suitable for waveguides with a thickness less than 0.5 mm.

With the present invention, high intensities may be coupled into the waveguide, without the disadvantage of the need of a thick waveguide. Thin waveguides may be appreciated because of flexibility and/or design aspects and/or costs.

The light of the light source is in general coupled into the waveguide via the first surface and/or the second surface. In an embodiment, light source light is coupled into the waveguide via the first surface or the second surface.

The waveguide plate may comprises one or more materials selected from the group consisting of a transparent organic material (support), such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment waveguide plate may comprise an inorganic material. Preferred inorganic materials are selected from the group consisting of glasses, (fused) quartz, transparent ceramic materials, and silicones. Especially preferred are PMMA, transparent PVC, or glass as material for the waveguide element.

The term "transparent" herein may especially refer to a waveguide plate that has a light transmission in the range of 90-100%, for light having a wavelength selected from the visible wavelength range. Herein, the term "visible light" especially relates to light having a wavelength selected from the range of 380-780 nm. The transmission can be determined by providing light at a specific wavelength with a first intensity to the waveguide under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). Note that the waveguide plate may be colored, due to the presence of luminescent material (see also below).

Herein the term "light source" may refer to one light source, but may in an embodiment also refer to a plurality of light source. Especially, the light source is a solid state light source (inorganic LED). In an embodiment, the light source is a LED based 3 W (or higher) light emitting surface with an area in the range from 1 $mm^2$ to 50 $mm^2$. The light source is especially configured to generate light source light (i.e. especially during use of the lighting device). The light source light may have any color, but for white light applications, the light source light may especially be selected from the UV and blue wavelength range. The light source may have any shape and may in an embodiment also comprise multiple semiconductor elements.

Assuming white light applications, i.e. the lighting device light is white, the light source light may for instance be UV, with one or more luminescent materials converting at least part of the UV light into RGB light and/or other colors, and optionally with one or more luminescent materials converting at least part of the converted light into other luminescent material emission.

The light source light might also be blue, with one or more luminescent materials converting at least part of the blue light into yellow and optionally red light, or into green and red light, and/or other colors, and optionally with one or more luminescent materials converting at least part of the converted light into other luminescent material emission.

Especially when a blue light source is used, it is preferred to couple part of the blue light into the waveguide with contact between the light source emitting surface and the waveguide plate. Hence, in a preferred embodiment, the light emitting diode surface is then optically coupled to the surface of the waveguide for coupling light into the waveguide (and may be in physical contact with each other). When the luminescent material is used between the light source and the waveguide plate, the light source, especially when a blue light source is used, is preferably in optical contact with the luminescent material which should be in optical contact with the waveguide. Especially when the light source is configured to generate blue light, and when there is no scattering, the light source is in optical contact with the waveguide (or luminescent material when arranged in between the light source and waveguide plate).

It is also possible to couple blue light into the waveguide using a reflecting element such as a diffuse reflector in optical contact with the waveguide which changes the direction of incoming light. Such reflector is then arranged downstream of the waveguide plate. Blue light from the light source is coupled into the waveguide plate and travels in the direction of the reflector, and is then coupled back into the waveguide by the diffuse reflector (see also below).

As will be clear to the person skilled in the art, different combinations of luminescent materials may be applied, i.e. a plurality of luminescent material may be applied (either as mixtures and/or in different regions, see also below). Also, a plurality of light sources may be applied, configured to generate emission at (substantially) equal wavelengths or in another embodiment at two or more (substantially) different wavelengths. In principle, UV and blue light sources may be applied (together). Also light sources emitting at other visible wavelengths may be applied, but at least part of the light provided by the light source(s) is converted by one or more luminescent materials into luminescent material emission.

As indicted above, the light source is configured to provide light towards a light incoupling surface. The surface of the transparent waveguide plate that receives the light source light first (i.e. first downstream waveguide surface), is indicated as incoupling surface. The surface where light escapes from the waveguide plate may herein also be indicated as outcoupling surface. Note that a surface may be at one position an incoupling surface and at another position an outcoupling surface.

In general, the optical axis of the beam of light provided to the waveguide plate is perpendicular to the light incoupling surface. As indicated above, the light incoupling surface will in general be the first surface or the second surface, although it is possible to have one or more light sources configured to couple light source light into the waveguide plate via the first surface and one or more light sources configured to couple light source light into the waveguide plate via the second surface. Hence, especially, the light source is configured to provide at least part of the light source light in a direction perpendicular to one or more of the first surface and the second surface. Since the first and the second surface will in general be parallel, the light source will in general be configured to provide at least part of the light source light in a direction perpendicular to the first surface and the second surface.

Note that the waveguide plate may be curved (see also above), and that locally the light source will in general be configured to provide at least part of the light source light in a direction perpendicular to the first surface and the second surface, but the light sources may mutually not be aligned parallel.

The transparent waveguide plate further comprises luminescent material. Hence, the transparent waveguide plate is a transparent luminescent waveguide. The transparent luminescent waveguide may for instance comprise a transparent polymer matrix (such as consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer), wherein one or more of organic luminescent molecules (such as perylene derivatives, bodipy, cyanine and diketopyrrolopyrrole, etc.), luminescent nano particles, and luminescent quantum dots (like InP, CdSe, etc.) are (molecularly) dispersed. The transparent luminescent waveguide may also comprise a transparent luminescent ceramic such as cubic YAG:$Ce^{3+}$ such as wherein Y is at least partly replaced with other metals like Sc, Gd or Lu, and Al is at least partly replaced by Ga, as known in the art (see also above reference on transparent luminescent materials).

Hence, the waveguide may comprise a transparent polymer with luminescent material, such as organic luminescent molecules, luminescent nano particles, or luminescent quantum dots, etc. dispersed therein, and in another embodiment, the waveguide may comprise transparent luminescent ceramic, wherein the ceramic is waveguide and luminescent material. The transparent luminescent waveguide may comprise more than one transparent polymer matrices in different regions.

As will be clear to a person skilled in the art, also a combination of one or more of such luminescent materials may be applied. The luminescent material is configured to convert at least part of the light source light. This indicates that there is at least one type of luminescent material present that converts at least part of the light source light into luminescent material emission. However, there may also be other luminescent materials present that convert at least part of the light source light and/or at least part of the luminescent material emission. Especially, the luminescent material is a down-converter, i.e. it converts light (especially light source light) into luminescent material emission having a larger (mean) wavelength than the light with which the luminescent material is excited (by the light source light and/or luminescent material emission).

The luminescent material may be used to couple light into the waveguide, but the luminescent material may also be used to couple light out of the waveguide plate. Especially, part of the luminescent material is at least configured to couple light into the waveguide plate. Outcoupling may also be performed with (non-luminescent) outcoupling means, see also below.

In a specific embodiment, the light source and the luminescent material are configured to generate white lighting device light. As will be clear to the person skilled in the art, this includes also embodiments wherein a plurality of light sources is applied and/or embodiments wherein a plurality of luminescent materials are applied (in whatever configuration, see also below).

To obtain white light, also the arrangement/configuration of other elements may be relevant, for instance one or more selected of the group of the spatial arrangement of luminescent materials, the spatial arrangement of reflective elements, the beam angle of the light source light, the refractive index of the transparent waveguide, etc. However, the person skilled in the art may chose those parameters, to optimize light incoupling and/or to optimize the desired outcoupling of the desired light.

The term white light herein, is known to the person skilled in the art. It especially relates to light having a correlated color temperature (CCT) between about 2000 and 20000 K, especially 2700-20000 K, and especially within about 15 SDCM (standard deviation of color matching) from the BBL (black body locus), especially within about 10 SDCM from the BBL, even more especially within about 5 SDCM from the BBL.

The term "comprises" here may refer to embodiments wherein the luminescent material is contained in the waveguide plate, but may also refer to embodiments wherein the luminescent material is on the first surface and/or on the second surface.

Hence, in an embodiment, the luminescent material is contained in the transparent waveguide plate. For instance, the luminescent material may be dispersed in the waveguide plate. Additionally or alternatively, the luminescent material may be distributed in the waveguide plate on a molecular level. For instance, nano particles may be dispersed in a polymer based waveguide plate but alternatively or additionally, organic dye molecules may be mixed in a polymer of a polymer based waveguide plate. Further, also a combination of one or more arrangements of the luminescent material may be applied, for instance some luminescent material in the waveguide plate and some luminescent material on the first and/or second surface of the waveguide plate (see also below).

In a specific embodiment, the transparent waveguide plate comprises an inhomogeneous distribution of the luminescent material. For instance, in an embodiment the transparent waveguide plate contains one or more discrete transparent regions comprising luminescent material. For instance, such discrete regions might be layers comprising luminescent material. The layers may be adjacent to each other, but may also be remote of each other.

Hence, in an embodiment the transparent waveguide plate contains a plurality of discrete transparent regions comprising luminescent material. The plurality of discrete regions may have different luminescent properties. Note that a discrete region may comprise a plurality of luminescent materials. The discrete regions within the waveguide plate are transparent, and thus allow transmission of at least part of the light (light source light and/or luminescent material light).

Especially, the luminescent material is arranged in the path of the beam of light of the light source. Especially, the luminescent material is arranged in the escape cone of the light source light, and may optionally extend beyond that cone. In such embodiment, the light escaping form the waveguide plate without conversion is minimized. Therefore, in an embodiment, the luminescent material is at least arranged within the escape angle of the light source light over the light source. Especially, the luminescent material may be arranged not only within the escape angle of the light source, but may also extend beyond that angle.

As indicated above, in an embodiment the lighting device further comprises a first reflective element arranged downstream of the transparent waveguide plate, opposite of the light source and configured to reflect at least part of one or more of the light source light and the luminescent material light back into the transparent waveguide plate. Hence, seen from the propagation of light of the light source, the light leaves the light source and enters the transparent waveguide at the incoupling surface (especially the first surface or second surface) and will travel in the direction of the opposite surface (especially the second surface or first surface). When the light in the transparent waveguide is not reflected back, part of the light may escape from the transparent waveguide. Hence, in an embodiment, directly opposite of the light source but at the other side of the waveguide, a reflective element is arranged. This reflective element may configured to reflect all light back, but may in an embodiment also be arranged to reflect part of the light back (for instance because its area is smaller than the beam). This reflective element will in general be a element which alters the direction of light, such a diffuse reflective element. Further reflective elements may be present, especially to facilitate a large number of total internal reflections.

When the reflective element is used in order to couple part of the blue light into the waveguide the reflective element is preferentially an element which alters the direction of from the source such as a diffuse reflector. Furthermore the reflector needs to be in optical contact with the wave guide.

Especially, the reflective element may be at least arranged within the escape angle of the light source light over the light source. In this way, most of the light may be coupled into the waveguide plate. In a specific embodiment, the reflective element extends beyond that angle, in order minimize escape from the waveguide plate.

The terms "upstream" and "downstream" relate to an arrangement of items or features relative to the propagation of the light from a light generating means (here especially the light source), wherein relative to a first position within a beam of light from the light generating means, a second position in the beam of light closer to the light generating means is "upstream", and a third position within the beam of light further away from the light generating means is "downstream".

Alternatively or additionally to the luminescent material contained in the waveguide plate, the transparent waveguide plate may comprise one or more discrete regions comprising luminescent material on one or more of the first surface and the second surface. Again, those discrete regions may include layers, but may in another embodiment also comprise dots, etc. The layers may be adjacent to each other, but may also be remote of each other.

Hence, in an embodiment the transparent waveguide plate contains a plurality of discrete transparent regions comprising luminescent material on one or more of the first surface and the second surface. The plurality of discrete regions may have different luminescent properties. Note that a discrete region may comprise a plurality of luminescent materials. The discrete regions on one or more of the first surface and the second surface of the waveguide plate may be transparent, and thus allow transmission of at least part of the light (light source light and/or luminescent material light), but are not necessarily transparent.

When the discrete regions on the first and/or second are transparent, preferably reflective elements are used to reflect at least part of the luminescent material light and/or light source light back into the waveguide plate. Hence, when the discrete regions are transparent, part of the light source light and/or luminescent material light may escape too early from the waveguide plate and luminescent material. Therefore, in an embodiment, wherein at least one of the one or more discrete regions is transparent, the transparent waveguide plate may further comprise a second reflective element configured to reflect at least part of one or more of the luminescent material emission and light source light back into the transparent waveguide plate. For instance, locally a stack may be obtained of waveguide plate, transparent discrete region with luminescent material and reflective element, respectively.

In a specific embodiment, directly opposite of the light source but at the other side of the waveguide, such luminescent material region and reflective element are arranged. This reflective element may configured to reflect all light back, but may in an embodiment also be arranged to reflect part of the light back (for instance because its area is smaller than the beam at that location).

This reflective element will in general be a diffuse reflective element. Further reflective elements may be present, especially to facilitate a large number of total internal reflections.

In yet a further specific embodiment, wherein the transparent waveguide plate comprises one or more discrete regions comprising luminescent material on one or more of the first surface and the second surface, at least one of the one or more discrete regions are configured to scatter at least part of one or of luminescent material emission and light source light back into the transparent waveguide plate. In such embodiments, light source light and/or luminescent material light are scattered back into the waveguide plate. In such embodiment, it may not be necessary to provide a second reflective element on the discrete region(s) with luminescent material, since the discrete regions may not be transparent.

In an embodiment the lighting device comprises a plurality of discrete regions (on the first and/or second surface) having different luminescent properties. The plurality of discrete regions may have different luminescent properties. Note that a discrete region may comprise a plurality of luminescent materials (such as a luminescent materials mixture). The discrete regions on the first and/or second surface of the waveguide plate may be transparent, and thus may thus allow transmission of at least part of the light (light source light and/or luminescent material light), but may also be reflective/scattering (see also above).

Especially, the luminescent material is arranged in the path of the beam of light of the light source. Especially, the luminescent material is arranged in the escape cone of the light source light, and may optionally extend beyond that cone. In such embodiment, the light escaping form the waveguide plate without conversion is minimized. Therefore, in an embodiment, the luminescent material is at least arranged within the escape angle of the light source light over the light source. Especially, the luminescent material may be arranged not only within the escape angel of the light source, but may also extend beyond that angle.

Light may be outcoupled from the waveguide via the first surface or via the second surface or via both surfaces, dependent upon the desired application. Hence, in an embodiment the first surface is the light incoupling surface, and one or more of the light outcoupling means are configured to couple luminescent material emission and optionally light source light out of the transparent waveguide plate in a direction away from the second surface, and alternatively or additionally, the first surface is the light incoupling surface, and one or more of the light outcoupling means are configured to couple luminescent material emission and optionally light source light out of the transparent waveguide plate in a direction away from the first surface.

The light outcoupling means may just be a roughened first and/or second surface of the waveguide. The light outcoupling means may be structures known in the art. The light outcoupling means may be contained by the waveguide plate but may alternatively or additionally, also be in the first surface and/or second surface, or alternatively or additionally on the first surface and/or second surface. For instance, scattering particles may be used within the waveguide plate and/or irregularities at the first surface and/or second surface may be applied. For instance, grooves and/or (other) indentations may be applied to assist outcoupling of the light in the waveguide to the exterior of the waveguide. The light outcoupling means may be arranged, for instance patterned, to facilitate a homogenous outcoupling of the light. In an embodiment, scattering particles comprise luminescent material.

The term "substantially" herein, such as in "substantially all light" or in "substantially parallel", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1A:
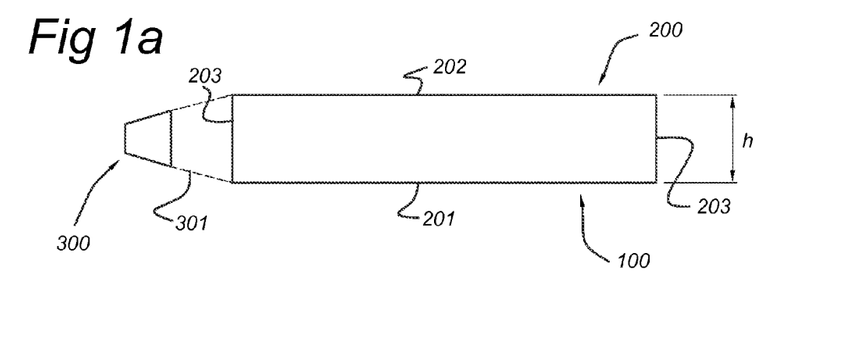
FIGS. 1a-1e schematically depict some aspects of lighting devices with waveguides.

FIG. 1a schematically depicts a lighting device 1 comprising a waveguide 200 having a first surface 201, a second surface 202 and an edge surface 203. The waveguide 200 is a plate, here planar, having a height h. The lighting device 1 further comprises a light source 300, which provides light to the edge surface 203 for coupling light source light 301 of the light source 300 into the waveguide 200.

The thinner the waveguide 200, i.e. with decreasing h, light incoupling may become difficult. Hence, the invention suggests providing light via another incoupling surface, especially in a direction perpendicular to one or more of the first surface 201 and the second surface 202, as shown in the drawings that follow.

The embodiments of the invention schematically depicted below are depicted with constant h. In general, h will be constant over the waveguide plate 200, but in a specific embodiment, h may also vary.

Figure 1B:
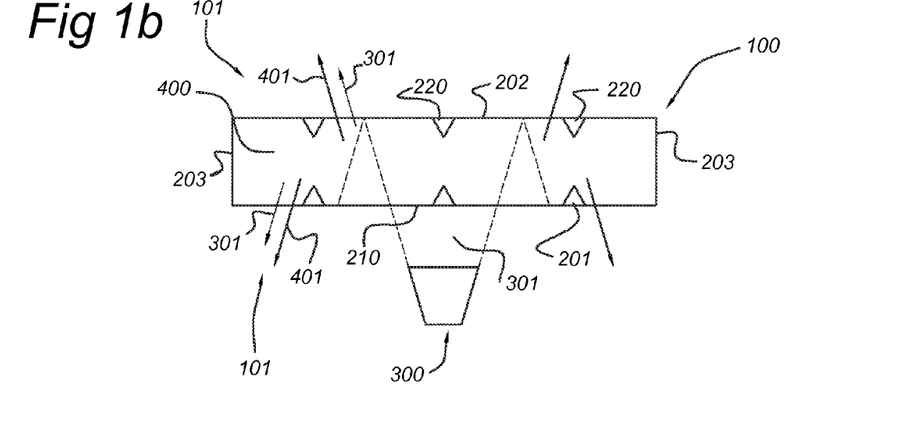

FIG. 1b schematically depicts an embodiment of lighting device 100 comprising transparent waveguide plate 200 with first surface 201, opposite second surface 202, and edge surface 203 between the first surface and the second surface 202. The lighting device 100 further comprises light source 300 (such as a LED) for providing light source light 301 towards light incoupling surface 210 of the transparent waveguide plate 200, wherein the light source 300 is configured to provide at least part of the light source light 301 in a direction perpendicular to one or more of the first surface 201 and the second surface 202. The light incoupling surface 210 is here first surface 201.

The transparent waveguide plate 200 further comprises a luminescent material 400 configured to convert at least part of the light source light 301 into luminescent material emission 401. This luminescent material 400 may allow generation of white light, optionally together with the light source light 301. The transparent waveguide plate 200 further comprises light outcoupling means 220 for coupling luminescent material emission 401 and optionally light source light 301 out of the transparent waveguide plate 200 as lighting device light 101 in a direction away from one or more of the first surface 201 and the second surface 202. In this schematic drawing, only one light source 300 is depicted and only a few light outcoupling means 220 are schematically depicted. Further, by way of example, the lighting device light 101 is coupled out to both directions, i.e. a direction away from the first surface 201 and a direction away from the second surface 202. However, the light outcoupling means and other optical elements such as reflective elements (see below), may be configured to have light, as lighting device light 101, outcoupled only to one direction.

By way of example, here lighting device light 101 appears to comprise both light source light 301 and luminescent material light 401. For instance, the former may be blue light and the latter may be yellow light, whereby white lighting device light 101 may be obtained.

The luminescent material may be distributed all over the waveguide plate. For instance, the waveguide plate may comprise a transparent polymer plate with luminescent material, such as quantum dots, dispersed therein. Or the waveguide plate may comprise a polymeric matrix with luminescent dye molecularly dispersed therein. Or the waveguide plate 200 may comprise a transparent luminescent ceramic material. FIG. 1b schematically depicts such embodiment wherein the luminescent material is homogeneously distributed.

Figure 1C:
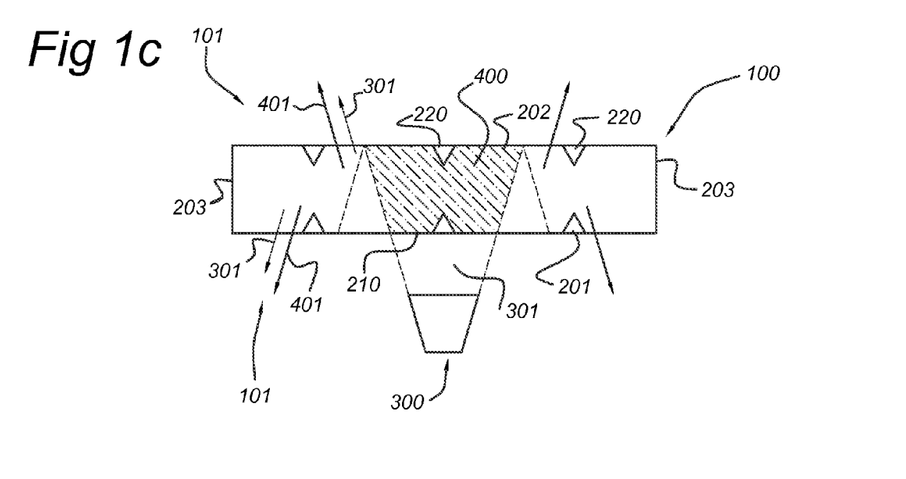

Alternative to FIG. 1b, FIG. 1c schematically shows an embodiment wherein the luminescent material is inhomogeneously distributed over the waveguide plate 200. FIG. 1c schematically depicts an embodiment wherein luminescent material 400 is at least present in that part of the waveguide plate 200, that is directly illuminated with light source light 301 of the light source 300. A substantial part of the light source light 301 may be converted within the waveguide 200 by luminescent material 400 into luminescent material light 401. In this way, the converted light is at least partly confined in the waveguide (and subsequently at least partly coupled out). As shown in this figure, the luminescent material 400 is at least arranged within the escape angle of the light source light over the light source. However, the luminescent material may also be arranged to extend beyond the escape angle of the light source light.

Figure 1D:
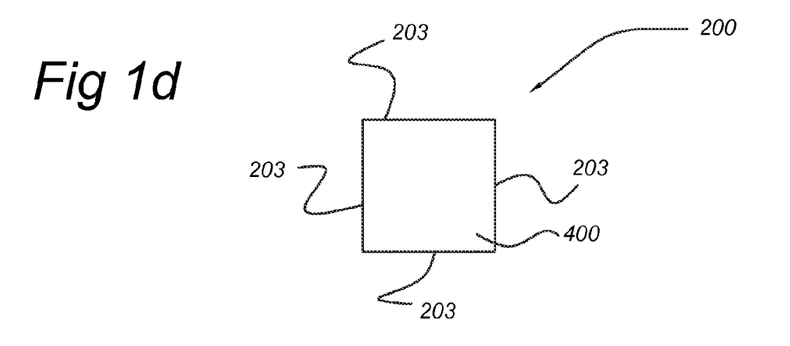

In FIGS. 1b-1c, the waveguide plate 200 is schematically depicted as seen from a side. Seen from the above (viewing either the first or the second surface) different shapes may be found, dependent upon the desired application and/or upon the desired model. For instance, a round, oval, rectangular, triangular, polygon, etc. may be obtained. By way of example, FIG. 1d schematically depicts a square waveguide plate 200. Note that the entire edge is indicated with reference 203.

Figure 1E:
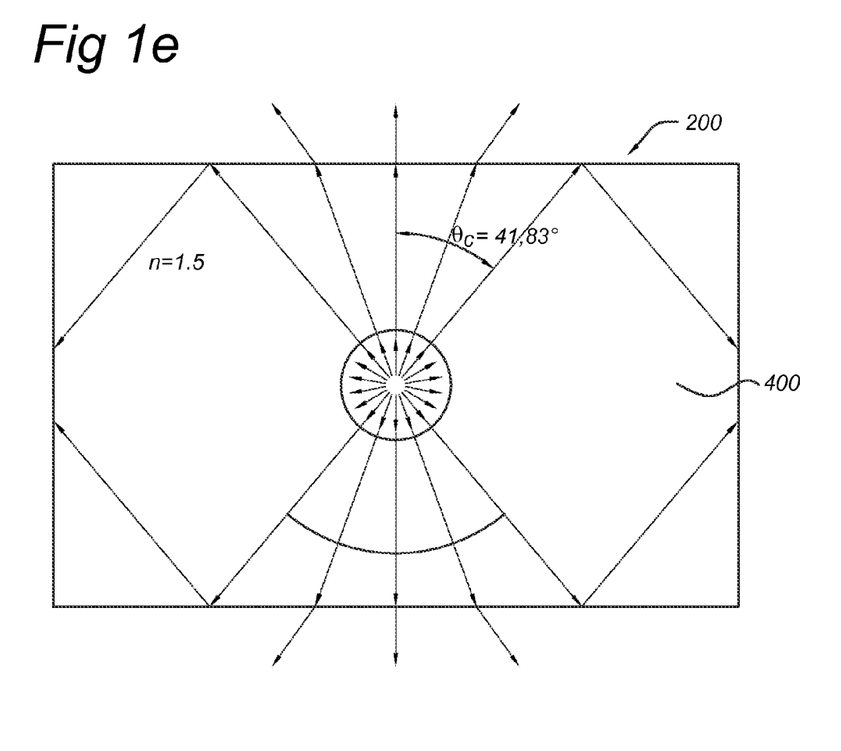

FIG. 1e shows an embodiment of a working principle of the invention. When the waveguide plate with luminescent material is irradiated regardless of the direction incoming beam when the luminescent entities such as organic molecules and quantum dots are randomly dispersed isotropic emission in the luminescent material takes place. Because transparent nature of the waveguide plate with luminescent material light emitted above the critical angle $\theta_c$ will be confined into the waveguide plate with luminescent material. Light which will be within the cone of the critical angle (41.83°) will escape the waveguide (the cone is thus 2 times the critical angle, in this case with n=1.5: 2*41.83°). In this example we assume a refractive index n of 1.5 for the luminescent material and calculate that 26% of the light converted in the luminescent layer escapes the layers (13% from the bottom and 13% from the top), leaving 74% for total internal reflection.

The critical angle and the thus the light confinement is very much dependant on the refractive index of the (luminescent) material. The relation critical angle and refractive index is given according to critical angle=arcsin(1/n), with n being the refractive index of the waveguide plate (with luminescent material (quantum dots, organic dye molecules, nano particles molecularly dispersed in a matrix or transmissive luminscent ceramic)) and the interface with the luminescent material is air. The energy coupled into the waveguide plate equal to sqrt{1−1/(n*n)}, with n as defined above. With increasing refractive index, the critical angle show a decrease confining more light into the waveguide plate (with luminescent material). When such a luminescent material is placed on top or within a transparent waveguide plate (and having optical contact with the waveguide plate) more or less light will become coupled into the waveguide depending on the refractive index of the waveguide plate.

Especially, the transparent waveguide plate 200 may comprise a transparent polymer matrix, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer), wherein one or more of organic luminescent molecules, such as perylene derivatives, bodipy, cyanine and diketopyrrolopyrrole, luminescent nano particles, and luminescent quantum dots, such as InP and CdSe, are dispersed. Alternatively, the waveguide plate 200 may comprise a transparent luminescent ceramic.

Figure 2A:
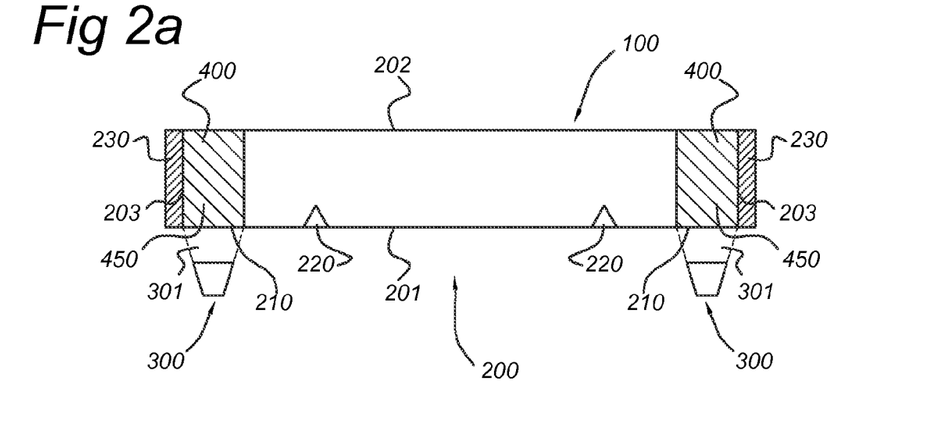
FIGS. 2a-2f schematically depict some embodiments of the lighting device of the invention.

FIG. 2a schematically depicts again an embodiment of the lighting device 100, wherein the transparent waveguide plate 200 comprises an inhomogeneous distribution of the luminescent material 400, herein in the form of discrete transparent regions 450 comprising luminescent material 400. When illuminated by light source light 301 light emitted in the luminescent material may travel within the waveguide 200 and at the light outcoupling means 220, light may be coupled out from the waveguide 200. Hence, in this way, the converted light is at least partly confined in the waveguide (and subsequently at least partly coupled out). By way of example, the waveguide plate 200 comprises at the edge reflector(s) 230. Reflectors 230 at the edges are shown by way of examples and are not necessarily present, neither in this embodiment, nor in the other embodiments schematically depicted herein. Further reflectors may be present, such as at the second surface 202 where regions 450 are located. Likewise, reflectors may be present at the first surface at the locations of regions 450, but such reflectors may be transparent for light source light 301 and reflective for luminescent material light.

Figure 2B:
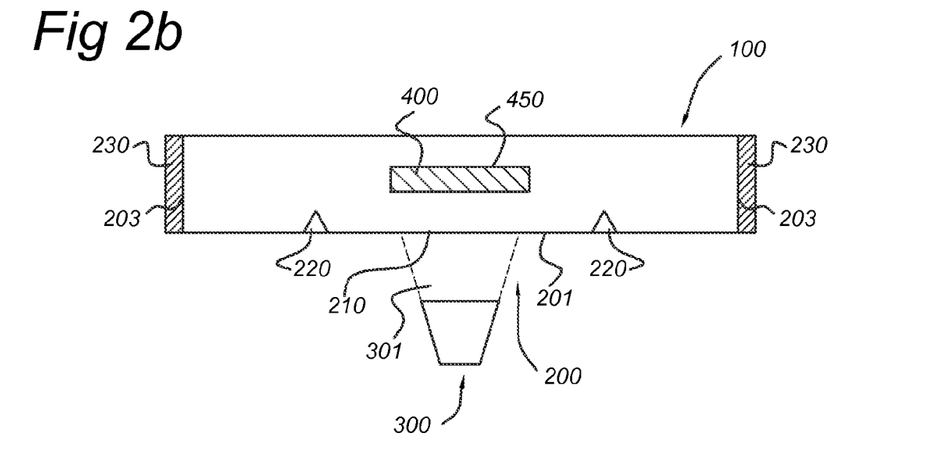

In the former embodiment, the discrete regions 450 were edge layers or edge parts with luminescent material 400. However, the discrete region(s) 450 may also be discrete layer(s) within the waveguide plate 200. An example is schematically shown in FIG. 2b. Such layer may for instance comprise an organic dye dispersed in an organic (polymeric) matrix) or a transparent luminescent ceramic material (see for instance U.S. patent application Ser. No. 10/861,172 (US2005/0269582), to U.S. patent application Ser. No. 11/080,801 (US2006/0202105), to WO2006/097868, to WO2007/080555, to US2007/0126017 and to WO2006/114726.). The discrete region 450 may for instance have the shape of a flake or a film.

Figure 2C:
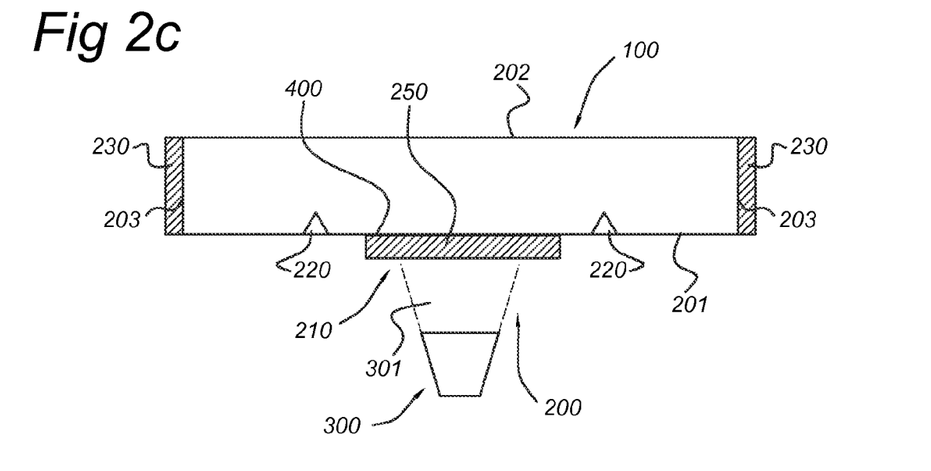

FIG. 2c shows a configuration where luminescent material 400 is placed on top of the waveguide plate 200 in optical contact with it and placed between the waveguide and the light source. The luminescent material 400 is arranged as discrete region 250, such as a layer, on the first surface 201. Here, the discrete regions 250 with luminescent material is transmissive. Light source light 301 converted by the luminescent material enters the waveguide 200 and may be coupled out (elsewhere). In this way, the converted light is at least partly confined in the waveguide (and subsequently at least partly coupled out).

In both embodiments of FIGS. 2b and 2c, the luminescent material 400 is by way of example at least arranged within the escape angle of the light source light over the light source 300. However, the luminescent material may also be arranged to extend beyond the escape angle of the light source light. This is for instance the case in the schematically depicted embodiment of FIG. 2c.

Figure 2D:
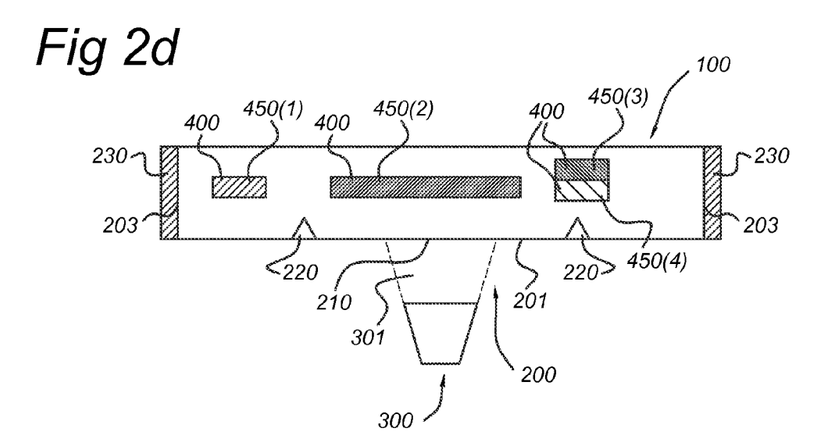

FIG. 2d schematically depicts an embodiment wherein the transparent waveguide plate comprises a plurality of discrete regions 450, schematically indicated with references 450(1)-

450(4), for instance each comprising luminescent material 400. Here, the luminescent material 400 is inhomogeneously distributed over the waveguide plate 200. The plurality of discrete regions 450 may have different luminescent properties. On the left side and in the middle, two different non-adjacent discrete regions 450(1) and 450(2), respectively, are depicted, and on the right two different adjacent discrete regions 450(3) and 450(4), respectively, are depicted, for instance two layers comprising different luminescent material(s) (mixture(s)). The luminescent material region 450(2) is directly illuminated by the light source light 301 of the light source 300 and is within the critical angle of the cone of the light source light 301 of the light source 300.

Figure 2E:
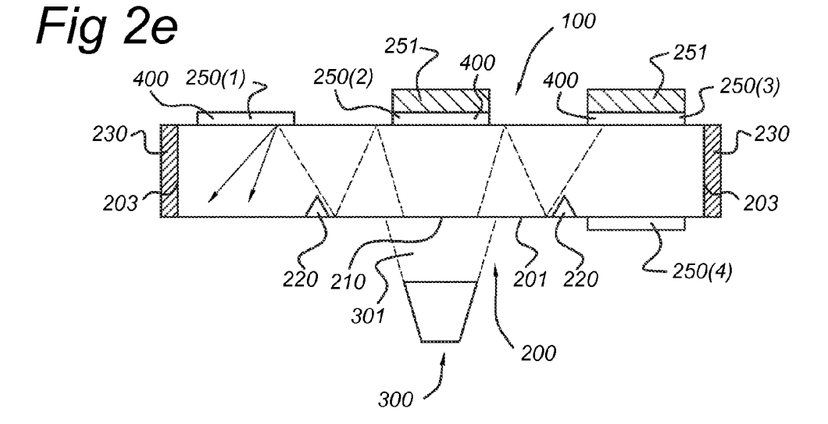

FIG. 2e schematically depicts an embodiment wherein the transparent waveguide plate 200 comprises one or more discrete regions 250 comprising luminescent material 400 on one or more of the first surface 201 and the second surface 202. Here, by way of example three of such discrete regions 250(1)-250(3) are provided on the second surface 202 and one (250(4)) is provided on the first surface 201. The first discrete region 250(1) may for instance be scattering. Hence, light within the waveguide plate 200 does not escape from the waveguide plate at the first discrete region 250(1), but is at least partly scattered and/or at least partly converted. More precisely, part may escape from the waveguide plate 200. This part may at least partly be converted in the discrete region 250(1) into luminescent material emission 401, which is amongst others scattered back into the waveguide plate 200.

The second discrete region 250(2) may for instance be transparent. Due to the presence of a reflective element 251 (herein also indicated as second reflective element), light is reflected back into the waveguide plate 200. Hence, also here substantially no light may (on balance) leave the waveguide plate 200. The third discrete region 250(3) may by way of example also be a transparent luminescent material containing region 250, with second reflector 251 configured to reflect luminescent material emission 401 and/or light source light 301 back into the transparent waveguide plate 200.

Figure 2F:
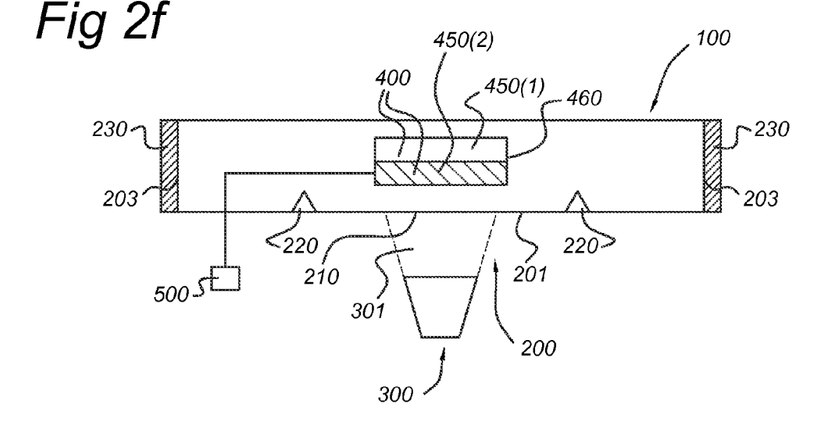

FIG. 2f schematically depicts an embodiment with again discrete regions 450 embedded within the transparent waveguide plate 200. In this embodiment, the second discrete region 450(2) comprises a PDLC (i.e. polymer dispersed liquid crystals). PDLC are for instance described in WO2006043196. In the PDLC scattering mode e.g. blue light of the light source 200, such as a LED, is converted to e.g. red light by the luminescent material 400 in de PDLC element. In the PDLC transparent mode e.g. blue light from the light source 200, such as a LED, is converted to e.g. yellow light by the luminescent layer on top of the PDLC element. In this way a color tunable waveguides plates 200 may be obtained. Other switchable elements which can be used include but are not limited to electro wetting element, Liquid Crystal Gels (LC-gel) or other liquid crystal based technologies. In addition, multiple or pixilated elements can be used as well.

The lighting device 100 may further comprise a controller 500, which may in this embodiment also be used to control the PDLC, but which may in general be configured to control the intensity of the light source(s) 200 and/or the color of the light source(s) 200. Hence, though not depicted in the other schematic drawings, each lighting device according to the invention may comprise controller 500 to control the intensity of the light source(s) 200 and/or the color of the light source(s) 200.

Figure 3A:
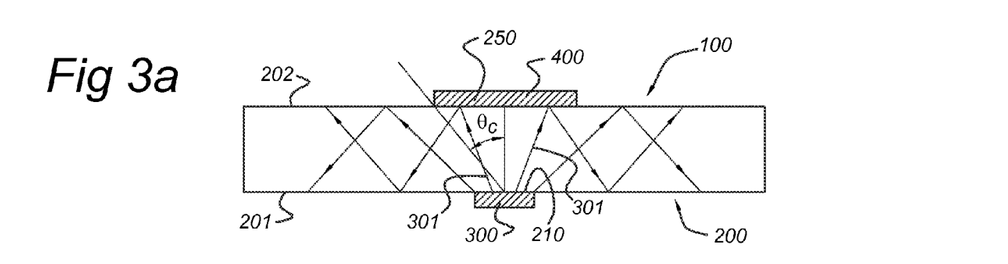
FIGS. 3a-3l schematically depict some further embodiments of the lighting device of the invention.

FIG. 3a schematically shows a specific embodiment. The light source 300, here a solid state light emitting diode, is optically coupled to the waveguide 200. In this arrangement light 301 emitted by the diode above the critical angle is coupled into the waveguide. The size of the of the luminescent material region 250 is chosen such that the size of the luminescent material region falls within the critical angle so that light from the light source 300 (here the LED) is absorbed by the luminescent material 400 which is then converted to another wavelength so it also becomes partially coupled into the waveguide plate 200 as a result of light conversion. This is indicated with the arrows leaving the luminescent material 400 from region 250 into the waveguide 200. The light source light 301 might for instance be blue light, and the luminescent material light might for instance be yellow, or red+green light. Here luminescent material 400 is shown as an element or region, such as a layer, placed on top of the waveguide plate 200 but it may also be a region within the waveguide (see other embodiments, for instance FIGS. 1c and 2b).

Figure 3B:
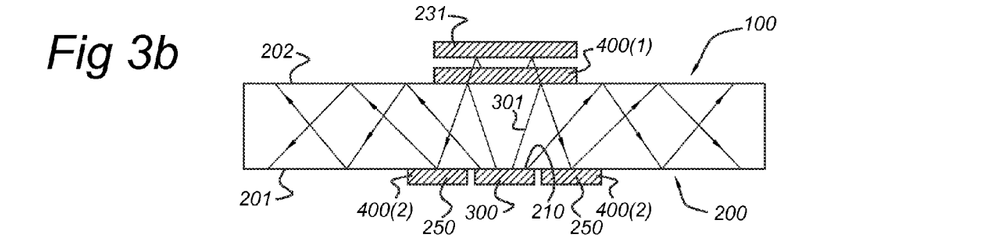

FIG. 3b shows yet another embodiment where reflector 231, such as a diffuse reflector, is placed above the region 250 with luminescent material 400 (here first luminescent material 400(1)), and which is not in optical contact with the waveguide plate 200 with luminescent material region 250. This configuration takes care of the converted light escaping first luminescent material 400(1). This light becomes diffusely reflected to large angles, and is coupled into the waveguide 200 again. In this way, the converted light is at least partly confined in the waveguide (and subsequently at least partly coupled out). Coupled into the waveguide 200 again, it may be absorbed by second luminescent material 400(2) and gets partially coupled into the waveguide plate 200 further increasing the efficiency of light coupling. The first luminescent materials 400(1), may for instance be yellow or green luminescent material and second luminescent materials 400(2) may for instance be orange or red luminescent material. Here luminescent material 400 in region 250 is shown as a element placed on top of the waveguide but it may also be region within the waveguide (see other embodiments, for instance FIGS. 1c and 2b).

Figure 3C:
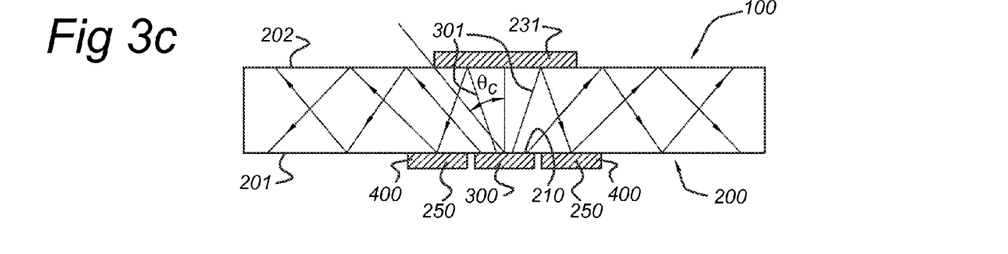

FIG. 3c shows yet another embodiment. In this embodiment a circular diffuse reflector (here also indicated with reference 231) is placed within the escape cone to have optical contact with the waveguide 200. Light diffusely reflected by this diffuse reflector can become coupled into the waveguide 200. Reflected light which still falls within the cone becomes converted to another wavelength by luminescent material 400 in region(s) 250 (here on first face 201) and partially becomes coupled (again) into the waveguide plate 200. Here luminescent material 400 is shown as a element placed on top of the waveguide plate 200, here first face 210, but it may also be region within the waveguide (see other embodiments, for instance FIGS. 1c and 2b).

Figure 3D:
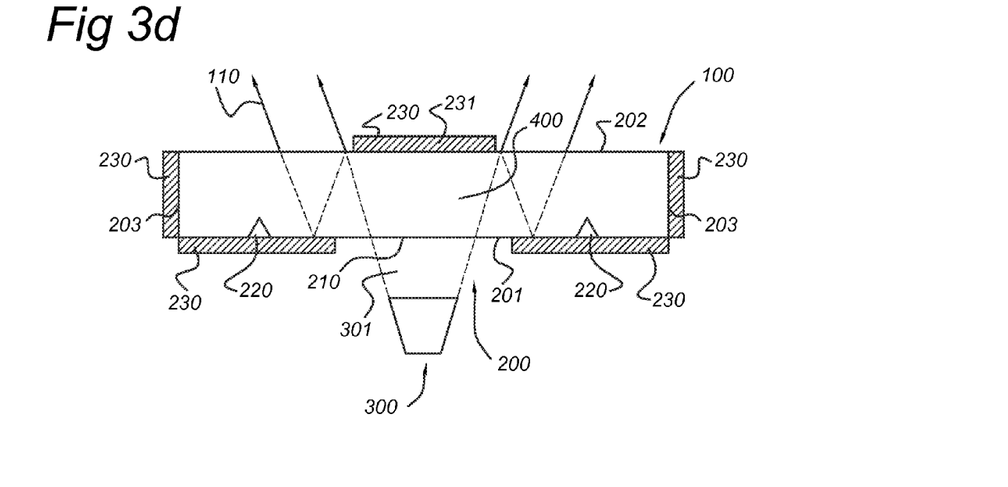

FIG. 3d schematically depicts an embodiment wherein mirrors 230 are used to guide the light within the waveguide plate 200. Note that this schematically depicted embodiment may be used in any of the described and schematically depicted embodiments.

Especially, first reflective element 231 is used, which is arranged downstream of the transparent waveguide plate 200, opposite of the light source 300 and configured to reflect at least part of the light source light 301 back into the transparent waveguide plate 200. The further reflectors 230 at the first surface 201 and/or the second surface 202 may have a similar function, but the first reflective element 231 especially has the function of at least partially preventing a direct escape of the light source light 301 and/or luminescent material light 401 from the opposite surface, relative to the light source 300. Note that for instance in FIG. 2e, the second reflective element 251 on the discrete region 250(2), arranged opposite of the light source 300, may also be considered a first reflective element, since also this element is configured to reflect at least part of the light source light 301 and/or the luminescent material light 401 back into the waveguide plate 200, while being arranged opposite of the light source 300. The further reflectors 230 at the first surface 201 and/or the second surface 202 may be smaller or larger than depicted. The reflector(s) at the edge may or may not be present (see also above). In this embodiment, luminescent material 400 may for instance be homogeneously distributed over the entire waveguide plate 200.

Figure 3E:
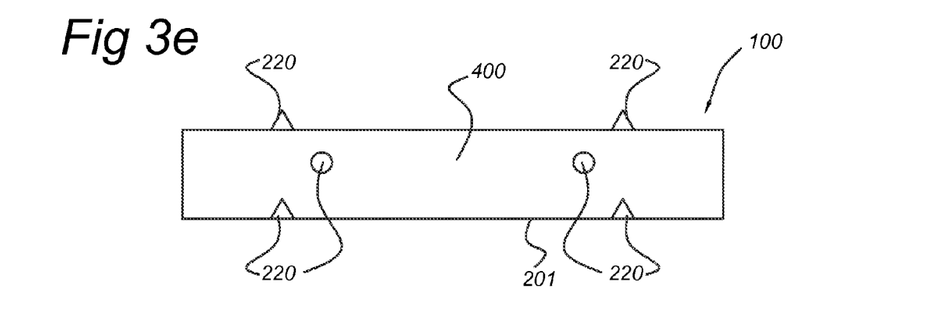

FIG. 3e schematically depicts some possible embodiments of light outcoupling means 220, arranged on the second surface 202, within the waveguide 200 or at the first surface 201, respectively. As will be clear to the person skilled in the art, the shape and position of the light outcoupling means 220 are only indicated by way of example.

Figure 3F:
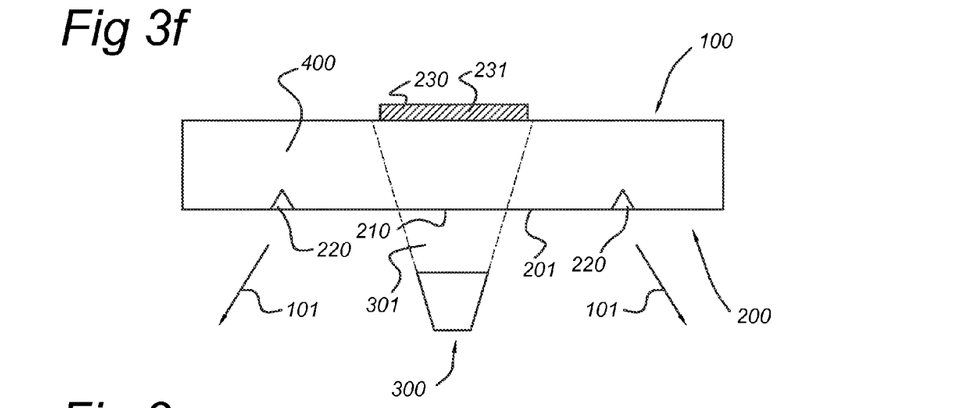

FIG. 3f schematically depicts an embodiment wherein the first surface 201 is the light incoupling surface, and wherein one or more of the light outcoupling means 220 are configured to couple luminescent material emission 401 and optionally light source light 301 out of the transparent waveguide plate 200 in a direction away from the first surface 201, as lighting device light 101.

Figure 3G:
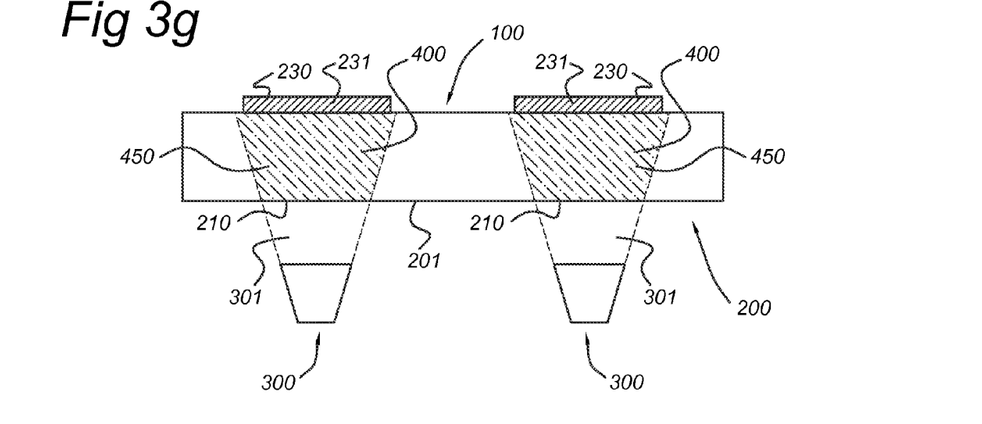

FIG. 3g schematically depicts an embodiment wherein the lighting device 100 comprises a plurality of light sources 300. By way of example, for the plurality of light sources 300, a plurality of accompanying first reflective elements 231 is shown. Luminescent material 400 may especially be within the area directly illuminated with light source light 301, indicated by regions 450, but may also extend beyond the escape cones (escape angles).

Figure 3H:
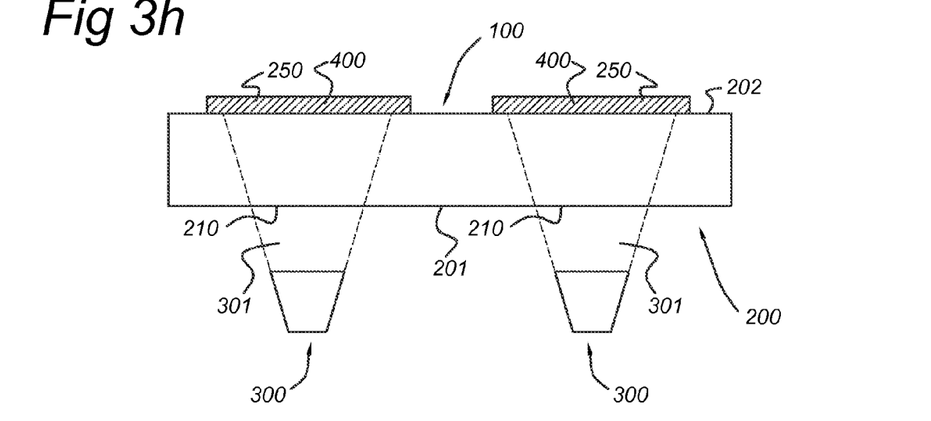

FIG. 3h schematically depicts an embodiment wherein the lighting device 100 comprises a plurality of light sources 300. By way of example, for the plurality of light sources 300, a plurality of accompanying luminescent material comprising regions 250 are shown. Preferably, the area thereof is as large as or larger than the escape cone of the light source 300 illuminating that area. As shown in this figure, the luminescent material 400 is at least arranged within the escape angle of the light source light over the light source. However, the luminescent material may also be arranged to extend beyond the escape angle of the light source light, as is also shown here.

Figure 3I:
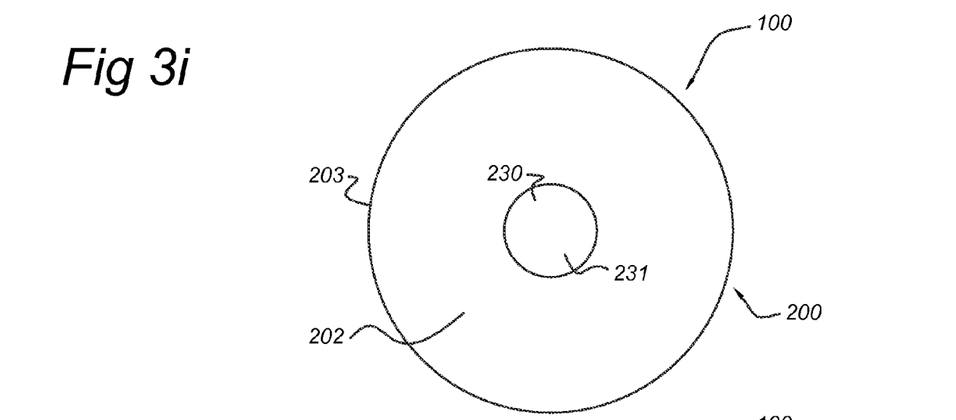

FIG. 3i schematically depicts a lighting device 100 which is round. The device 100 is shown from above, with the first reflective element 231 in the centre. Light sources, not shown, irradiate the waveguide plate 200 from below and light source light 301 and/or luminescent material light 401 is reflected back into the waveguide plate 200.

Figure 3J:
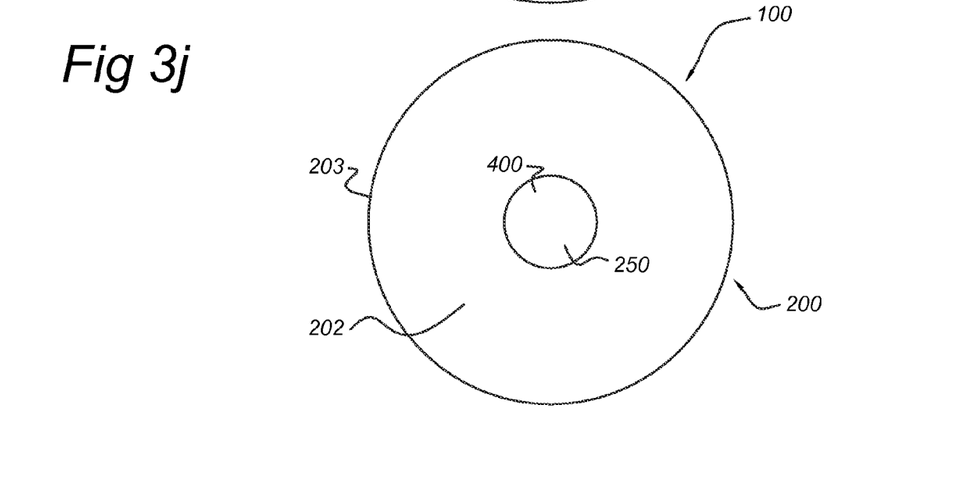

FIG. 3j schematically depicts also a lighting device 100 which is round. The device 100 is shown from above, with the luminescent comprising region 250, with luminescent material 400, in the centre. Light sources, not shown, irradiate the waveguide plate 200 from below and light source light 301 and/or luminescent material light 401 are coupled into the waveguide plate 200.

Figure 3K:
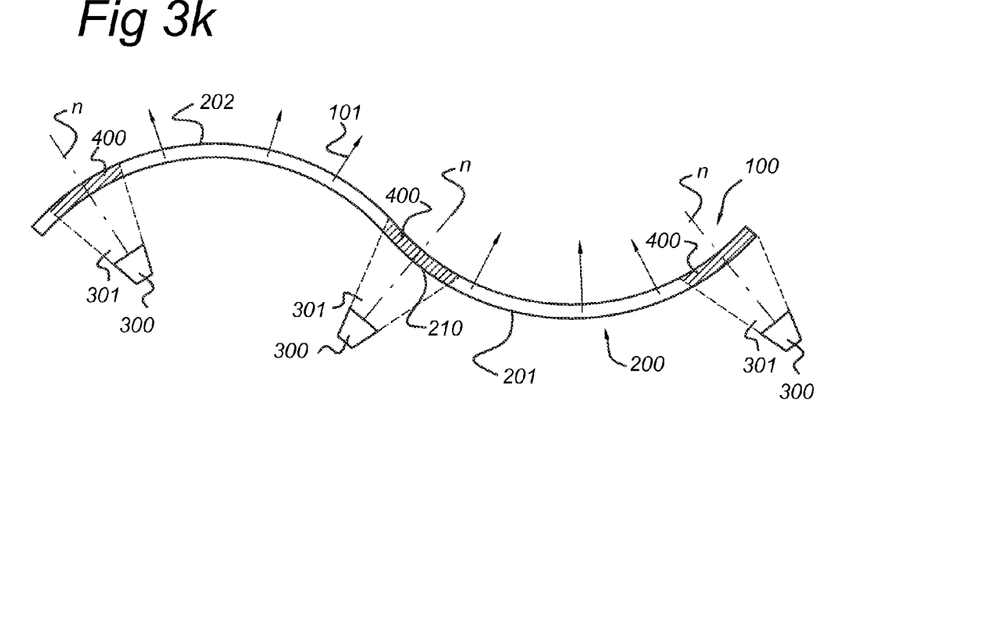

The waveguide plate 200 may in principle have any shape, even curved. An example is shown in FIG. 3k. Note that also in such embodiment, the light source(s) 300 is (are) configured to provide at least part of the light source light 301 in a direction perpendicular to one or more of the first surface 201 and the second surface 202 (here thus to both surfaces 201, 202). A normal n, is shown. The optical axis (not shown) of the light source light (beam) 301) may thus substantially be parallel to the normal n to (here) the first and the second surfaces 201,202. Here it appears that the light sources 300 are configured to provide at least part of the light source light 301 in a direction perpendicular to the first surface 201 and the second surface 202, but the light sources 300 are mutually not aligned parallel (due to the curvature of the transparent waveguide plate 200). In this schematically depicted embodiment, the height of the waveguide plate 200 is the same over substantially the entire waveguide plate 200. In these embodiments luminescent material is used in or on top of the waveguide for coupling light into the waveguide. In this schematically depicted embodiment, the plane of the waveguide plate 200 is curved.

Figure 3L:
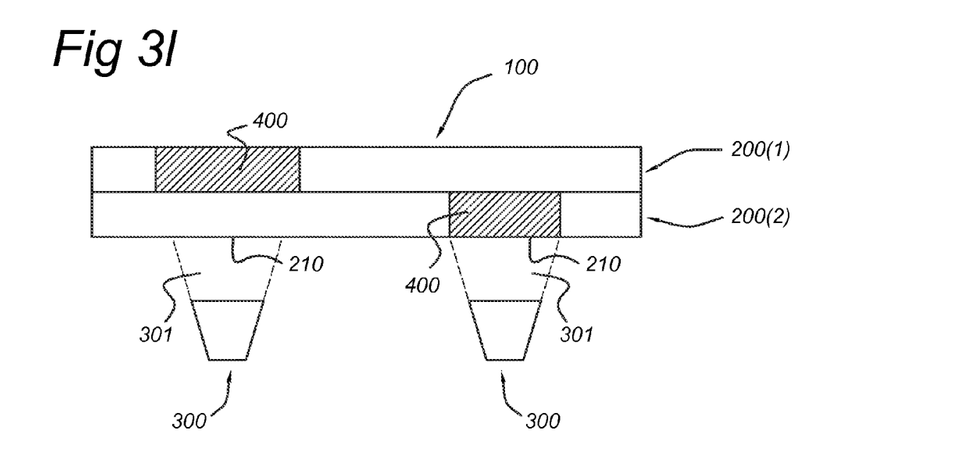

Also more than one waveguide plate 200 may be used. FIG. 3l schematically depicts such embodiment, wherein a plurality of waveguide plates 200 is applied, indicated with references 200(1) and 200(2). One or more of the plurality of plates 200 may comprise luminescent material 400 in (or on top) of the waveguide plates. The luminescent materials (mixtures) in the different plates 200 may be the same of may be different.

The invention claimed is:

1. A lighting device comprising:
   a transparent waveguide plate, comprising a first surface, an opposite second surface, and an edge surface between the first surface and the second surface;
   a light source for providing light source light towards the transparent waveguide plate, wherein the light source is configured to provide at least part of the light source light in a direction perpendicular to one or more of the first surface and the second surface, wherein the light source light is coupled into the waveguide plate via at least one of the first surface or the second surface, and
   wherein the transparent waveguide plate further comprises:
   a luminescent material configured to convert at least part of the light source light into luminescent material emission, wherein the luminescent material is arranged in the path of a beam of the light source light,
   a light outcoupling structure configured to couple at least a portion of the luminescent material emission out of the transparent waveguide plate as lighting device light in a direction away from one or more of the first surface and the second surface,
      wherein the transparent waveguide plate comprises one or more discrete regions comprising the luminescent material on one or more of the first surface and the second surface, and wherein at least one of the one or more discrete regions are configured to scatter at least part of one or more of the luminescent material emission and the light source light back into the transparent waveguide plate.

2. The lighting device according to claim 1, wherein the luminescent material is contained in the transparent waveguide plate.

3. The lighting device according to claim 1, wherein the transparent waveguide plate comprises a transparent polymer matrix, wherein one or more of organic luminescent molecules, luminescent nano particles, and luminescent quantum dots, are dispersed.

4. The lighting device according to claim 1, wherein the transparent waveguide plate comprises a transparent luminescent ceramic.

5. The lighting device according to any one of the preceding claims, wherein the luminescent material is at least arranged within the escape angle of the light source light over the light source.

6. The lighting device according to claim 1, further comprising a first reflective element arranged downstream of the transparent waveguide plate opposite of the light source and configured to reflect at least part of one or more of the light source light and the luminescent material light back into the transparent waveguide plate.

7. The lighting device according to claim 6, wherein the reflective element is at least arranged within the escape angle of the light source light over the light source.

8. The lighting device according to claim 1, wherein the light source is in optical contact with the waveguide.

9. The lighting device according to claim 1, wherein said one or more discrete regions comprise a plurality of discrete regions having different luminescent properties.

10. The lighting device according to claim 1, wherein the light source light is coupled into the waveguide plate via the first surface, and wherein the light outcoupling structure is configured to couple at least a portion of the luminescent material emission out of the transparent waveguide plate in a direction away from the second surface.

11. The lighting device according to claim 1, wherein the light source light is coupled into the waveguide plate via the first surface, and wherein the light outcoupling structure is configured to couple at least a portion of the luminescent material emission out of the transparent waveguide plate in a direction away from the first surface.

12. The lighting device according to claim 1, wherein the light source and the luminescent material are configured to generate white lighting device light.

13. The lighting device according to claim 1, wherein the transparent waveguide plate is curved.

14. A lighting device comprising:
a transparent waveguide plate, comprising a first surface, an opposite second surface, and an edge surface between the first surface and the second surface;
a light source for providing light source light towards a light incoupling surface of the transparent waveguide plate, wherein the light source is configured to provide at least part of the light source light in a direction perpendicular to one or more of the first surface and the second surface,
wherein the transparent waveguide plate further comprises:
a luminescent material configured to convert at least part of the light source light into luminescent material emission, wherein the luminescent material is arranged in the path of-a beam of the light source light,
a light outcoupling structure configured to couple at least a portion of the luminescent material emission out of the transparent waveguide plate as lighting device light in a direction away from one or more of the first surface and the second surface,
wherein the transparent waveguide plate comprises one or more discrete regions comprising the luminescent material on one or more of the first surface and the second surface, and wherein at least one of the one or more discrete regions are configured to scatter at least part of one or more of the luminescent material emission and the light source light back into the transparent waveguide plate; and
a first reflective element arranged downstream of the transparent waveguide plate opposite of the light source and configured to reflect at least part of one or more of the light source light and the luminescent material light back into the transparent waveguide plate.

* * * * *